United States Patent [19]

Fontaine et al.

[11] Patent Number: 4,670,961
[45] Date of Patent: Jun. 9, 1987

[54] PROCESS AND ASSEMBLY DEVICE INTENDED PARTICULARLY FOR BODY PRODUCTION LINES

[75] Inventors: Christian Fontaine, Orcemont-Rambouillet; Pascal Vaumoron, Boulogne Billancourt; Gerard Pinchon, Acheres; Christian Brachais, Grandcamp, all of France

[73] Assignee: Renault Automation, Boulogne-Billancourt, France

[21] Appl. No.: 858,058

[22] Filed: Apr. 29, 1986

[30] Foreign Application Priority Data

Apr. 30, 1985 [FR] France ............................. 85 06540

[51] Int. Cl.[4] ...................... B21D 39/03; B23P 19/00; B65G 47/00
[52] U.S. Cl. ..................................... 29/429; 29/33 K; 29/430; 29/563; 29/791; 29/823; 198/346.1; 414/786
[58] Field of Search ............... 29/33 K, 429, 430, 464, 29/563, 564, 791, 822, 823, 824; 198/346.1; 414/786

[56] References Cited

U.S. PATENT DOCUMENTS

| 2,779,092 | 1/1957 | Gordon | 29/430 |
| 4,411,354 | 10/1983 | Thibault et al. | 29/430 X |
| 4,494,687 | 1/1985 | Rossi | 29/563 X |

FOREIGN PATENT DOCUMENTS

| 83328 | 5/1982 | Japan | 29/823 |
| 2089296 | 6/1982 | United Kingdom . | |
| 2114067 | 8/1983 | United Kingdom . | |

*Primary Examiner*—Howard N. Goldberg
*Assistant Examiner*—Ronald S. Wallace
*Attorney, Agent, or Firm*—Oblon, Fisher, Spivak, McClelland & Maier

[57] ABSTRACT

Process for assembling bodies, particularly for vehicle production lines, of the type adapted to a plurality of models of vehicles and their variants, in which a perfect geometry of a body at a work station is assured by means of a machine module and a structure module; a complete work cycle incorporates a feeding of a body, a distribution and a presentation of geometry tools, an intervention of robots or operators, and an evacuation of the assembled body.

10 Claims, 8 Drawing Figures

PROCESS AND ASSEMBLY DEVICE INTENDED PARTICULARLY FOR BODY PRODUCTION LINES

BACKGROUND OF THE INVENTION

1. Field of the Invention

This invention relates to body production lines, for example, of motor vehicles. It aims more particularly at a process and apparatus for assembly of these bodies by use of such lines.

2. Description of the Related Art

The prior art in this specific field does not disclose or suggest any system capable of permitting the passage on the same line of a plurality of models of vehicles and of their evolutionary variants.

Generally, tools are put onto lateral frames which can move parallel to the axis of transfer and are indexable at the work station. Each pair of frames is specific to a particular body.

The drawbacks thus encountered are numerous:

1. The geometry of a body is obtained by two independent frames of reference;
2. Taking into account the axial references on a body is difficult;
3. Robots or operators must intervene between or through these lateral frames;
4. The passage of at least three different bodies becomes very difficult;
5. The weight to be moved is considerable;
6. The principle used is incompatible with welding involving manual tongs; and
7. Reconvertability remains difficult.

SUMMARY OF THE INVENTION

The invention has as its object the remedying of these drawbacks by:

1. Simultaneously assembling different bodies on the same line and thus adapting production to demand;
2. Being equipped with a production means making possible a progressive investment as a function of needs.

For this purpose, and according to an essential feature of the invention, a perfect match to a geometry of a body at a work station is assumed by means of a machine module and a structure module in a programmed complete work cycle which incorporates a feeding of a body to be assembled from storage, a distribution and a presentation of geometry tools, a geometry input, an intervention of robots or operators, and an evacuation of the assembled body.

These features make it possible to make a perfectly convertible and flexible installation for performing operations on bodies.

According to another feature, this installation comprises a machine module which includes a gantry frame, called a reference arch, for receiving the upper and lower positioning tools, stationary roller tables on which handling sleds move, roller cases mounted on elevators and able to receive these sleds, and mobile carriages able to be coupled to a motorized shuttle carriage, each mounted above a lower tool and traveling on rails below these stationary roller tables.

Changing of the lower tools as a function of the body that arrives is made automatable and programmable.

According to another feature of the invention, this installation includes a structure module made up of a gantry and two symmetrical units each comprising a rotating magazine for upper tools driven by an orientation ring gear, a pinion and a geared servomotor, and a flap provided with a vertically mobile scissors table and on the lower part of which upper tools are articulated around a horizontal pin able to rest as a reference on a portion of the gantry frame called a reference arch.

The rotating magazine makes it possible to have a considerable number of upper tools.

Bringing this flap down above the machine module to present the upper tools makes it possible to free the lateral parts of the flexible assembly stations; passage of the operators or robots is thus greatly facilitated.

BRIEF DESCRIPTION OF THE DRAWINGS

Other features and advantages of the invention will appear more clearly on reading the following description of a preferred embodiment, given by way of non-limiting example with reference to the accompanying drawings in which.

DETAILED DESCRIPTION OF THE PREFERRED EMBODIMENT

According to the figures, this body assembly device is made up of two distinct parts: a machine module 4 and a structure module 6.

Figure 1:
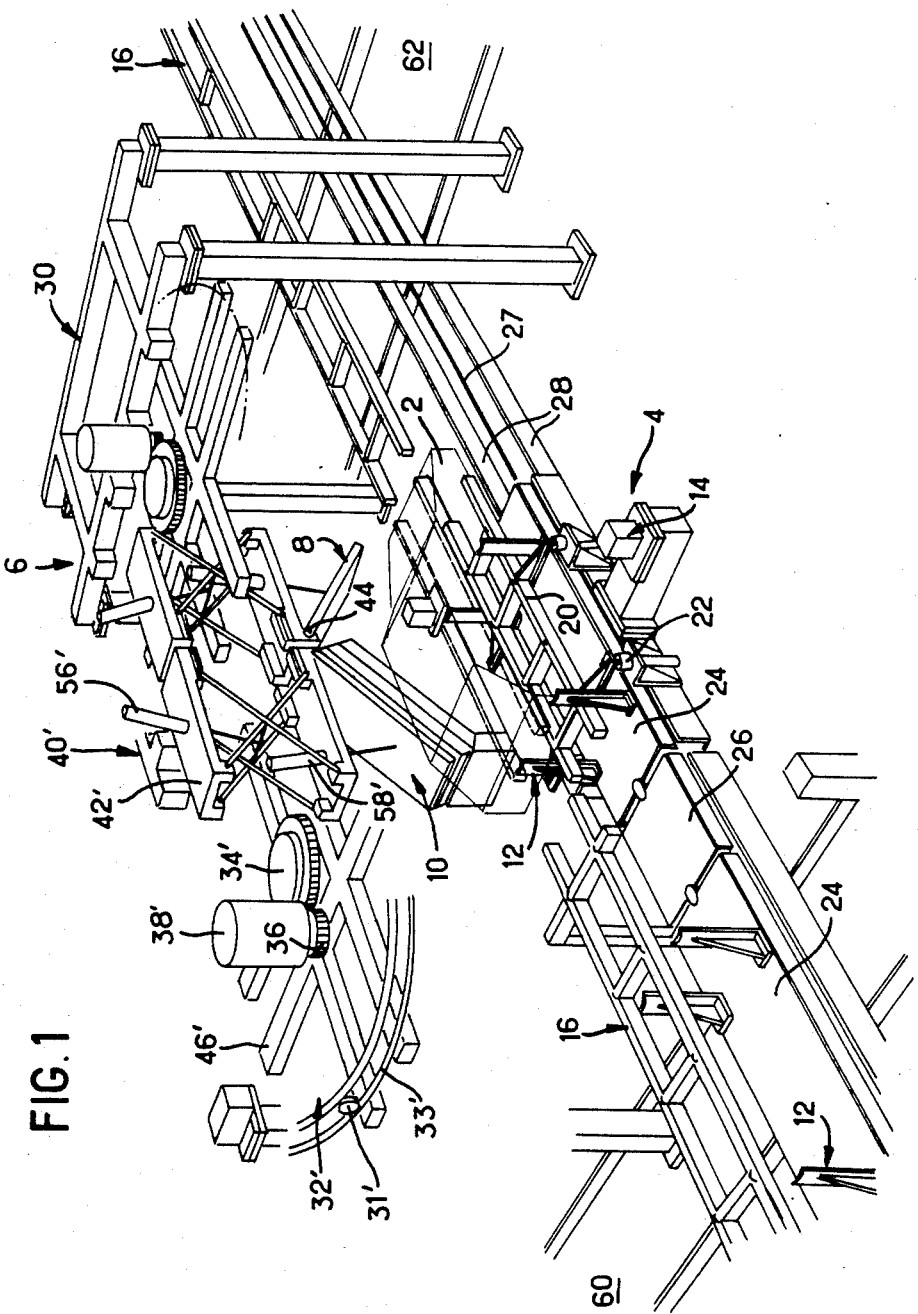
FIG. 1 shows a partial longitudinal view in perspective of an assembly device according to the invention.

The machine module includes a gantry frame called a reference arch 14 (only the base is shown in FIG. 1, for clarity) for receiving upper positioning tools 8, 10 and lower positioning tool 12, stationary roller tables 16 on which move handling sleds 18, roller side cases 20 mounted on elevators 22 and able to receive these sleds, and mobile carriages 24 that can be coupled to a motorized shuttle carriage 26, each carriage 24 or 26 mounted above a lower tool 12 and traveling on rails 28 below the stationary tables 16.

The structure module 6 consists of a gantry 30 and two symmetrical units each of which comprises a rotating magazine 32, 32' for upper tools 8, 10, driven by an orientation ring gear 34, 34', a pinion 36, 36' and a geared servomotor 38, 38'; and a flap 40, 40' provided with a vertically mobile scissors table 42, 42' and on whose lower part an upper tool 8 or 10 is articulated around a horizontal pin 44, 44'.

In machine module 4, mobile carriages 24 move in the direction of transfer on the rails 28 below the track of handling sleds 18 which carry bodies 2. Each carriage 24 comprises a removable platform on which is fastened a lower tool specific to a body. A guide rail 27 on which two sets of rollers with vertical axes rest, is placed between rails 28. A rack is fastened on this guide rail to cooperate with a pinion fixed to carriage 24.

A servomotor is mounted on shuttle carriage 26, which is placed between two mobile carriages 24. A pinching system (not shown) is provided to obtain a precise stopping position in the direction of transfer, and a locking of the unit of these carriages 24 and 26.

Upstream and downstream from the work station, a mobile carriage 24 can be withdrawn perpendicular to the axis of transfer to respective exchange stations 60 and 62.

For each body, there are provided a single lower tool 12 and two upper tools 8, 10, intended respectively for the front and rear of the body. A change in the configuration of the work station is therefore possible during the time of transfer from one type of body to another type of body.

A basic version makes it possible to have four types of lower tools and four types of upper tools, front and rear.

A possible variation consists in associating upper tool changers with the rotating magazines 32, 32', and lower tool changers with the machine module 4.

The upper front tools 8 and back tools 10 are driven by two identical control systems.

Tools 8, 10 are returned by flaps 40, 40'. Upon bringing these tools into a work position on a body 2, the side parts of the assembly station are freed to facilitate passage of operators 68 or robots 70.

These tools are removable and can be transferred from an inactive location, on a rotating magazine 32 or 32', to an active location on a flap 40.

Figure 5:
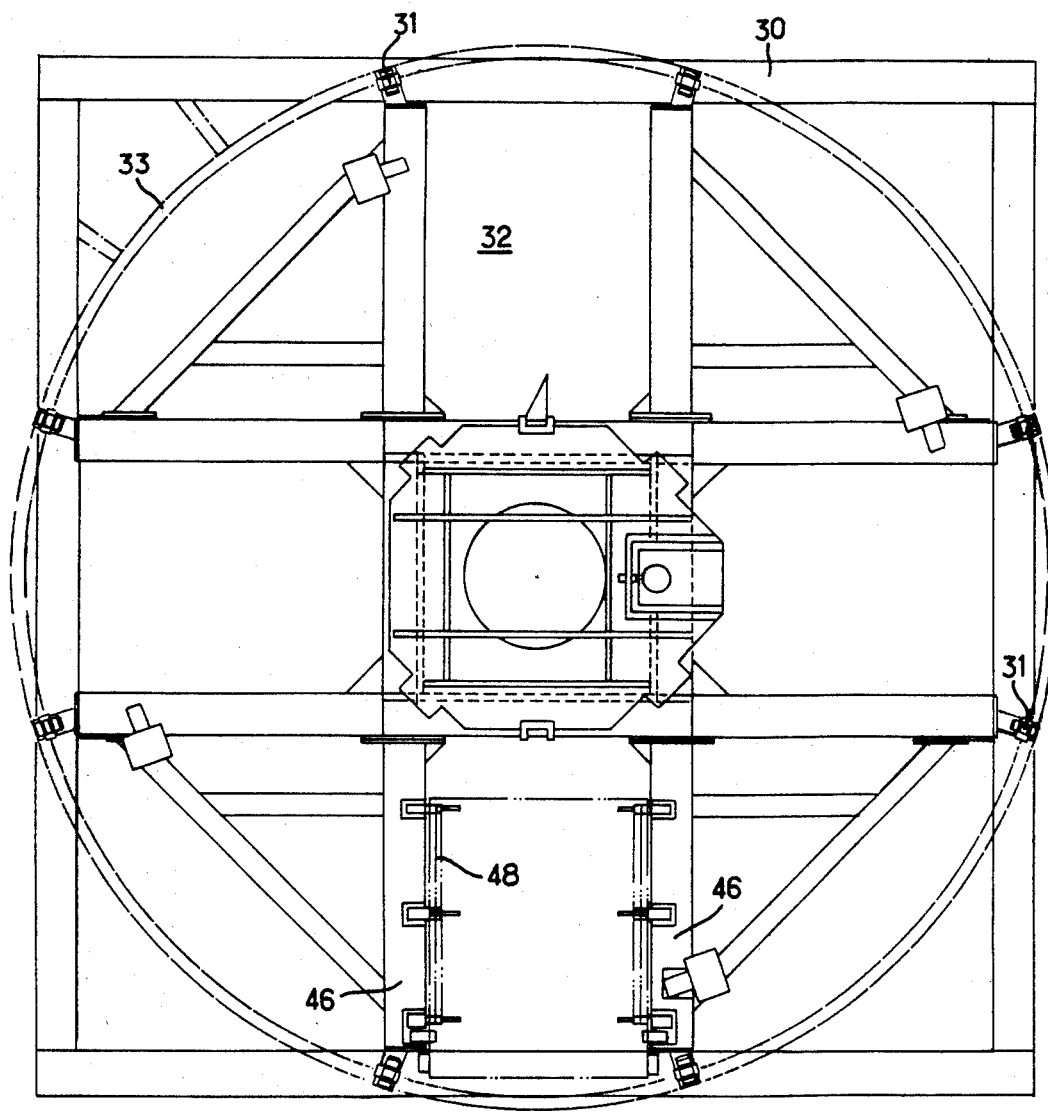
Figure 6:
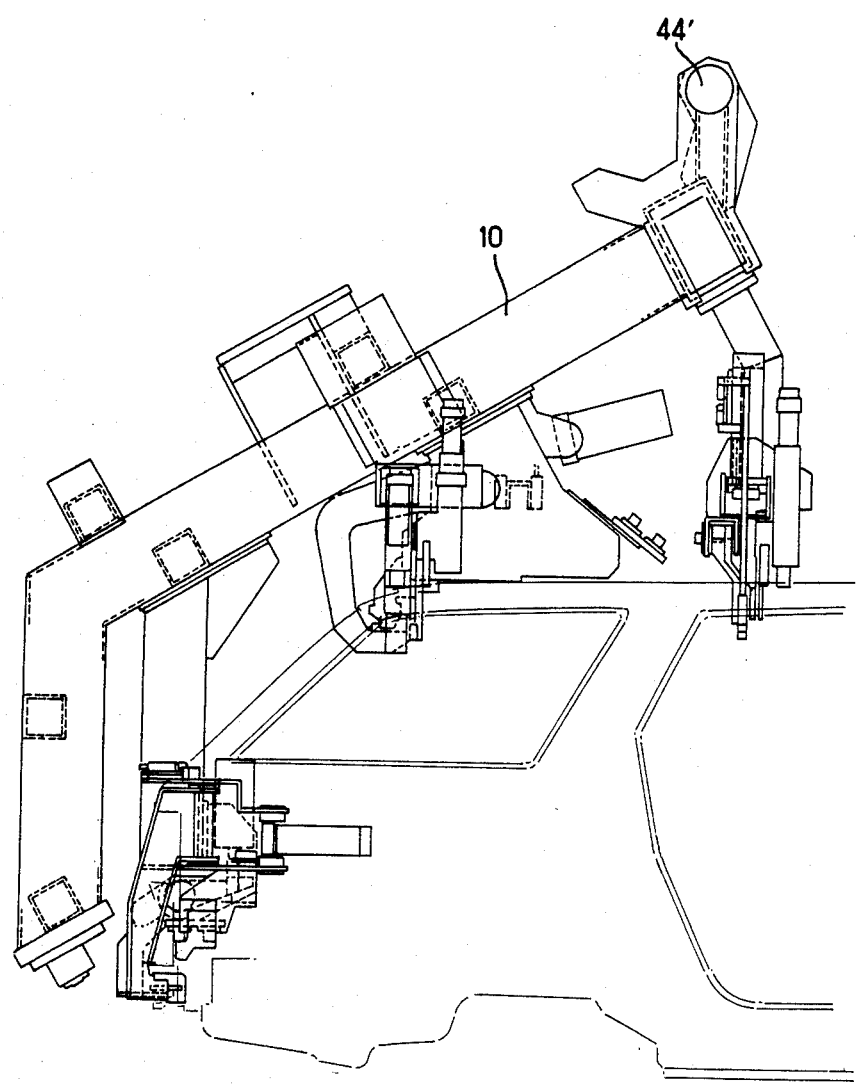
FIG. 6 shows a profile view of an upper tool used in this device.
Figure 7:
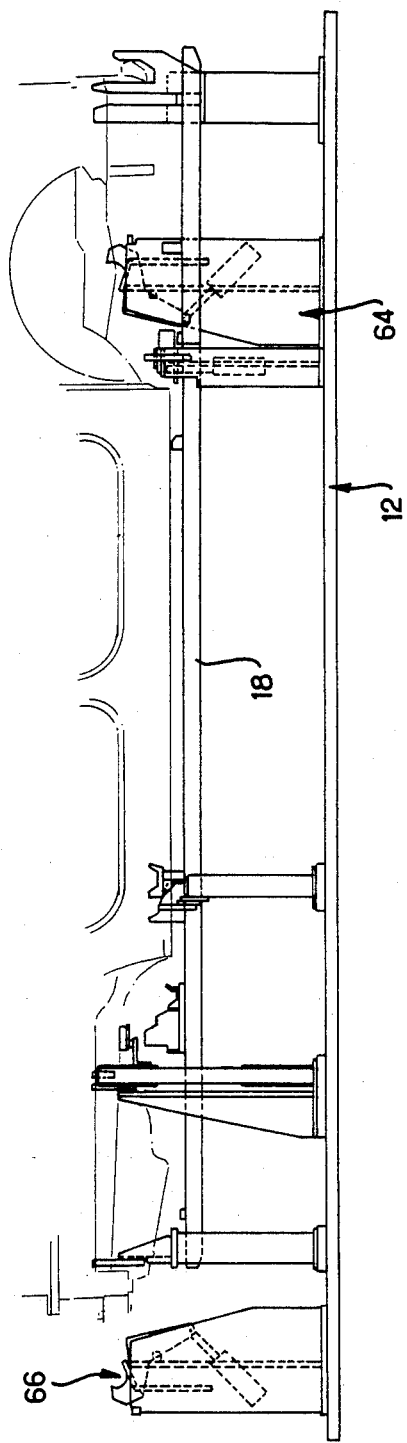
FIGS. 7 and 8 show front and top views of a lower tool used in this device.
Figure 8:
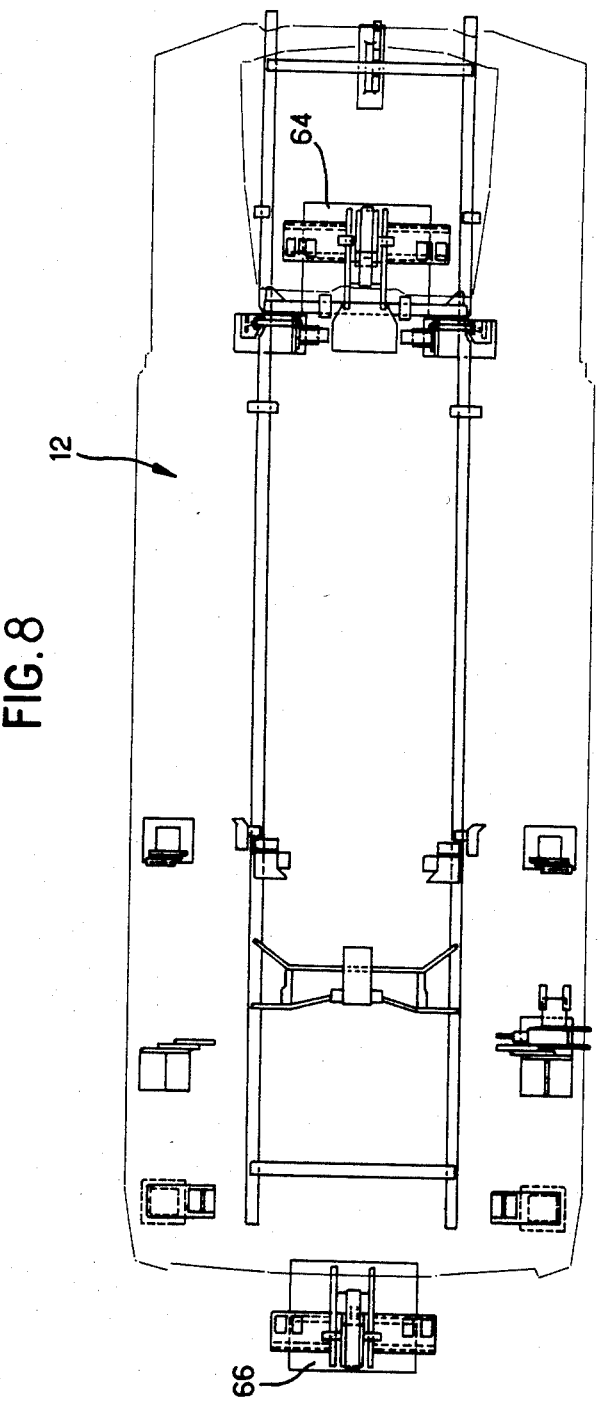

Rotating magazine 32, 32' is designed to receive four upper tools $8_i$, $10_i$ (FIG. 5) which rest on eight side members 46, 46' connected to a post. The rotating magazine has rollers 31, 31' on its periphery and can turn on a ring 33, 33' fixed to gantry 30. The rotation of the orientation ring gear 34, 34', connected to magazine 32, 32', is performed by geared servomotor 38, 38' acting on pinion 36, 36'. This servomotor may be programmed with acceleration and deceleration ramps, to obtain a precise stopping position. An indexing system makes it possible to make sure of this precise stopping by bringing the rotating magazine back to the desired position if necessary, and also controls the locking of the magazine in this position.

Upper tools $8_i$, $10_i$, located on cross members 46, 46', are indexed and held by articulated catches 48, 48' forming running rails for these tools and provided with rollers. This makes it possible to withdraw the tools from the in a direction perpendicular to the axis of transfer of the bodies. Discharging (or recharging) can be automated to increase the productivity of the magazine.

Presentation of these tools to a working position is performed by two distinct movements: first, a vertical descent by means of a scissors table 42, 42' suspended from gantry 30 and operated by a hydraulic jack 56, 56'; and second, a swinging around a horizontal pin 44, 44', fixed to upper tool 8, 10, by a determined angle varying as a function of the body that arrives, and by the action of a hydraulic jack 58, 58'. When this angle is large, a second jack can be associated with jack 58, 58'.

At the end of rotation, upper tool 8, 10 is put in reference to and clamped on a portion of the gantry frame 14 called a reference arch and lower tool 12, respectively by use of a centering foot 64, 66 fixed to the lower tool.

Indexing and locking of an upper tool $8_i$, $10_i$ on scissors table 42, 42' are performed during the rotation of magazine 32, 32' by tenons 50, 50' fixed to the latter, and T-grooves 52, 52' made in the upper tool and in which the tenons, driven by jacks 54, 54', can loosely engage.

Clamping of this tool to flap 40, 40' is then performed. Then the flap is unlocked to start a vertical descent, followed by a rotation about pivoting pin 44 until the tool is referenced on arch 14. The upper tool is kept on its supports by its own weight, all clamps being freed to avoid stresses.

To put this upper tool back in the rotating magazine, the elements that bind it to the machine module have to be removed.

This tool is then again clamped to the flap and raised to the level of cross members 46, 46'. The flap is then locked in high position.

Raising of the tool automatically assures opening of articulated catches 48, 48' by a cam. An overtravel is performed to close these catches.

Even if the same tool is to be used in the following cycle, there is a stop at this stage. Otherwise, the tool is freed from the flap to come to rest in the magazine. The advance of this magazine is then performed after retraction of a bolt (indexing of the magazine).

Figure 2:
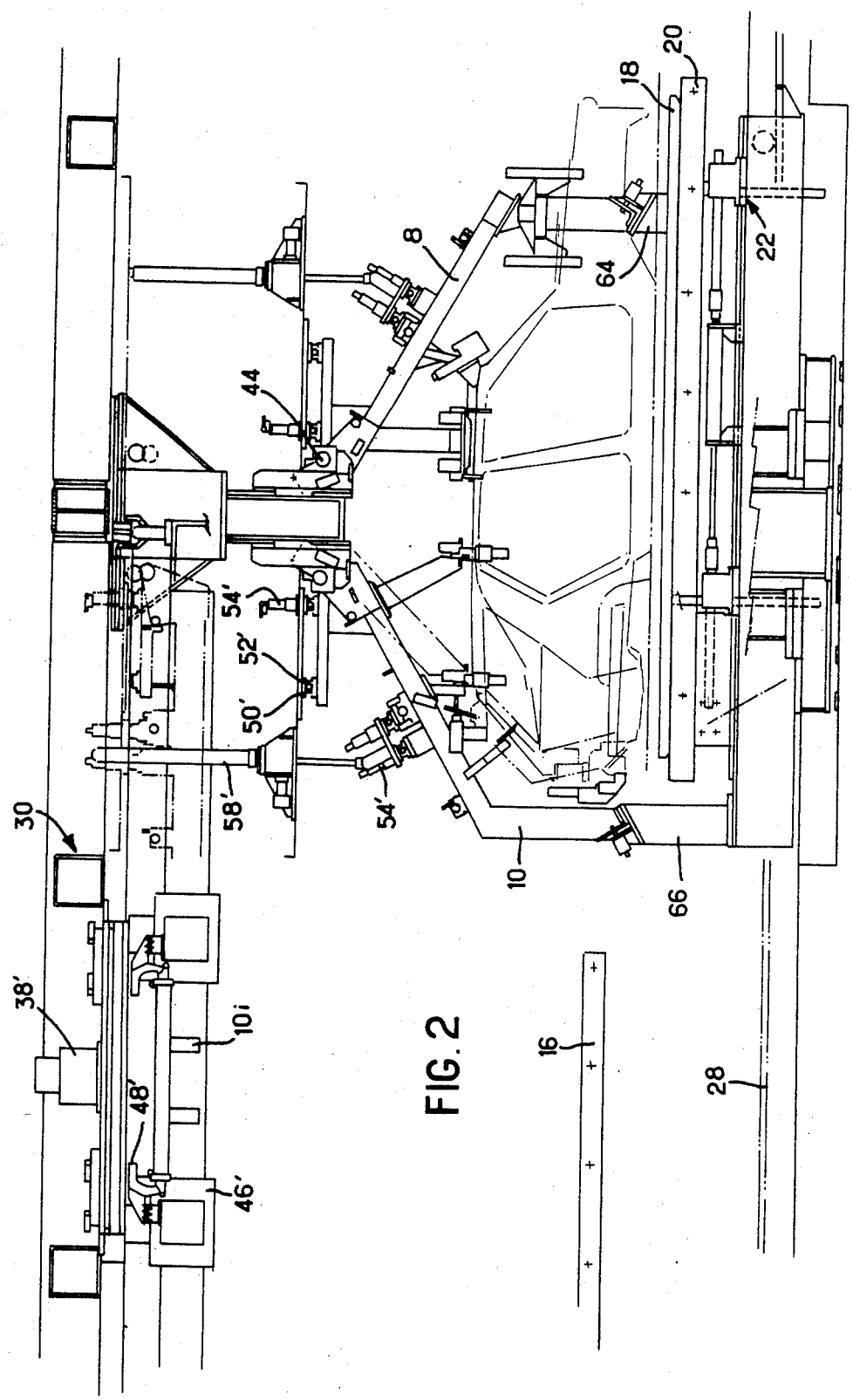
FIG. 2 shows a partial longitudinal view of this device.
Figure 3:
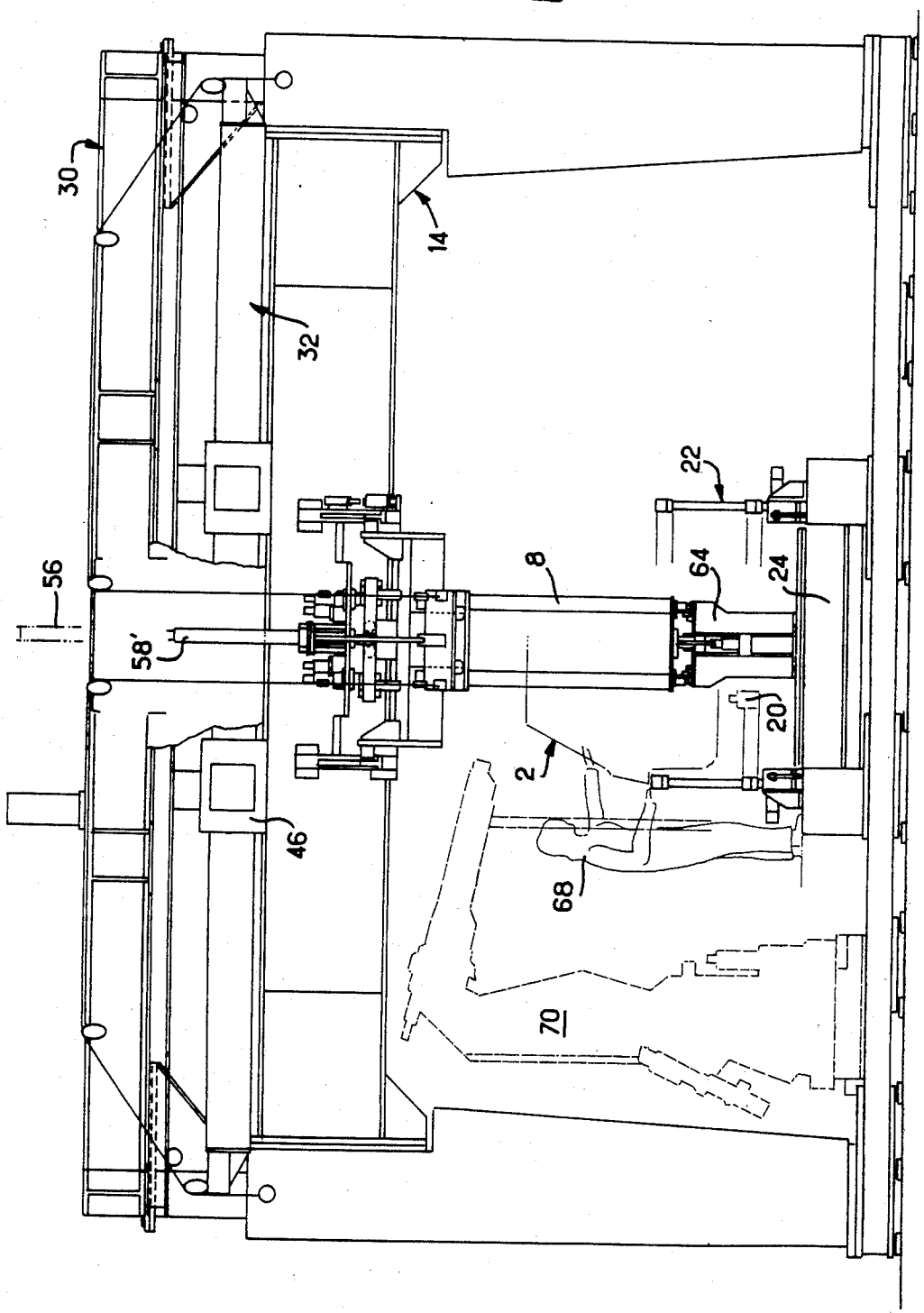
FIG. 3 shows a partial crosswise view of this device.
Figure 4:
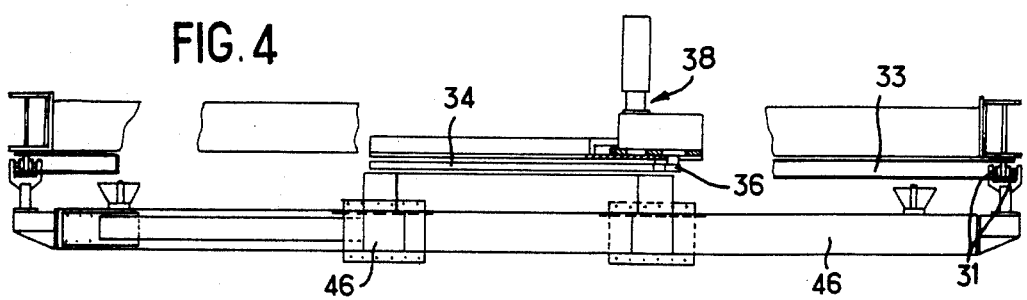
FIGS. 4 and 5 show partial front and top views of a rotating magazine used in this device.

The body assembly device described above functions as follows, following a complete work cycle, with reference to FIGS. 1, 2 and 3.

A body 2 temporarily assembled and placed on the handling sled 18 is directed to the work station by traveling the sled on stationary table 16, then on roller cases 20.

The unit consisting of the body, the sled and roller cases is then lowered under the action of elevators 22 until the body rests on the references of lower tool 12.

The vertical descent of scissors tables 42 and swinging of upper tools 8, 10 are performed in a coordinated manner.

Pneumatic clamping of the body elements to all the reference portion of the upper and lower tools is then performed to put these elements in exact positions.

Operators 68 or robots 70 then intervene to perform the assembly of the body, for example, by welding.

Then the phase of pneumatic unclamping of the body at the end of assembly occurs.

Upper tools 8 and 10 are then brought back to the level of magazines 32, 32'.

Elevators 22 then bring the unit of body-sled-roller cases to the level of stationary table 16.

The assembled body is then evacuated to a downstream station, after which a new body arrives as the work station.

Three possible cases arise at this moment and during the movements of the bodies:

1. The following body is identical with the preceding one. The cycle described is repeated.

2. The following body belongs to the family of the preceding one (for example, sedan and station wagon). The lower tool is kept, while the upper tools must be changed. Putting magazines 32, 32' into rotation then automatically causes unlocking and separation of the preceding upper tools, then indexing and locking of the selected upper tools. These operations are performed during the transfer of the bodies, which does not impact on the cycle time. The work cycle then continues as in the first case.

3. The following body is totally different from the preceding one. The upper tools are changed as in the second case. The lower tool, on a mobile carriage 24 coupled to motorized shuttle carriage 26, is changed either by indexing at the work station, from the other mobile carriage coupled to this shuttle carriage, or by replacement of one carriage 24 by another mobile carriage carrying the suitable tool, waiting at the upstream exchange station 60 or downstream exchange station 62, outside the transfer line.

Movements of these carriages are performed during the advances of the bodies, which does not impact on the cycle time.

Obviously, numerous modifications and variations of the present invention are possible in light of the above teachings. It is therefore to be understood that within the scope of the appended claims, the invention may be practiced otherwise than as specifically described herein.

We claim:

1. A process for assembling a plurality of models of vehicle bodies in a production line, comprising the steps of:
   mounting a vehicle body on a movable carriage;
   feeding said carriage into a work station defined by a machine module and a structure module;
   selecting positioning tools corresponding to said body and mounted on said machine module and structure module;
   presenting said positioning tools to said body so as to position said body;
   performing operations on said body;
   removing said tools from said body; and
   removing said body from said work station.

2. An apparatus for assembling a plurality of models of vehicle bodies in a production line, comprising a machine module including:
   a gantry frame forming a work station and including, reference arch means for receiving upper tools;
   stationary roller tables extending to said work station;
   roller cases in said work station;
   elevator means for vertically moving said roller cases;
   handling sleds supporting vehicle bodies and movably mountable on said stationary roller tables and said roller cases;
   rail means positioned below said stationary tables;
   mobile carriages movably mounted on said rail means and supporting lower tools; and
   shuttle carriage means for moving said mobile carriage means,
   whereby a vehicle body mounted on one side handling sled may be transferred from said stationary roller tables to said roller cases and lowered by said elevator means onto said lower tools.

3. The apparatus of claim 2 including a structure module comprising two symmetrical units, each including:
   a rotating magazine;
   upper tools supported by said magazine;
   means including a servomotor having a pinion and a ring gear for rotatably driving said magazine; and
   flap means having a scissors table for vertically transferring said upper tools toward a vehicle body in said work station,
   wherein said upper tools are pivoted to said scissors table about horizontal axes for movement into engagement with said vehicle body.

4. The apparatus of claim 3 wherein said magazine includes side member means for supporting said upper tools and articulated catch means for delivering said upper tools to said flap.

5. The apparatus of claim 3 including tenons and cooperating T-grooves formed on said upper tool and scissors table for securing said upper tools to said scissors table.

6. The apparatus of claim 3 including hydraulic jack means for vertically moving said scissors table and for pivoting said upper tools.

7. The apparatus of claim 3 wherein said gantry includes ring means for rotatably supporting said magazine.

8. The apparatus of claim 3 including an upper tool changer associated with said magazine.

9. The apparatus of claim 2 including lower tool exchange means associated with said rail means and extending perpendicular thereto.

10. The apparatus of claim 2 including reference means on said reference arch for fixing a position of said upper tools.

* * * * *